(12) United States Patent
Bacca

(10) Patent No.: US 7,871,175 B1
(45) Date of Patent: Jan. 18, 2011

(54) APPARATUS AND METHOD OF DRAWING WITH LIGHT

(75) Inventor: Natasha Dawn Bacca, 2908 NE. Baroness Pl., Bend, OR (US) 97701

(73) Assignee: Natasha Dawn Bacca, Bend, OR (US)

(\*) Notice: Subject to any disclaimer, the term of this patent is extended or adjusted under 35 U.S.C. 154(b) by 109 days.

(21) Appl. No.: 12/337,178

(22) Filed: Dec. 17, 2008

Related U.S. Application Data (60) Provisional application No. 61/008,112, filed on Dec. 17, 2007.

(51) Int. Cl.
    *B43K 29/10* (2006.01)

(52) U.S. Cl. .................. 362/118; 362/800; 362/187; 362/555; 362/579

(58) Field of Classification Search .............. 362/118, 362/187, 553, 555, 579, 157, 168, 169, 173, 362/174–177, 205, 335; 250/227.13
    See application file for complete search history.

(56) References Cited

U.S. PATENT DOCUMENTS

| | | | | |
|---|---|---|---|---|
| 4,249,808 A | * | 2/1981 | Webster | 396/548 |
| 4,455,369 A | * | 6/1984 | Purro | 430/357 |
| 5,450,148 A | * | 9/1995 | Shu et al. | 353/42 |
| 5,788,359 A | * | 8/1998 | Halsey et al. | 362/118 |
| 6,811,280 B1 | * | 11/2004 | Sharrah et al. | 362/202 |
| 7,084,389 B2 | * | 8/2006 | Spector | 250/227.13 |
| 7,344,270 B2 | * | 3/2008 | Kim | 362/205 |
| 2005/0195591 A1 | * | 9/2005 | Garcia et al. | 362/118 |
| 2008/0077200 A1 | * | 3/2008 | Bendett et al. | 607/89 |
| 2008/0318154 A1 | * | 12/2008 | Wyres | 430/270.1 |
| 2009/0180283 A1 | * | 7/2009 | Chu | 362/259 |

OTHER PUBLICATIONS

Information on a proper Applicant's response.*

\* cited by examiner

*Primary Examiner*—Jong-Suk (James) Lee
*Assistant Examiner*—Leah S Lovell (57) ABSTRACT

An apparatus and method of drawing with light. The apparatus comprising of a cylindrically shaped body which houses a light emitting diode of various colors and intensities. The apparatus additionally comprising of a lens which focuses the light emitted through an aperture of various sizes. Under darkroom conditions, the apparatus is manually passed over chosen areas of light sensitive paper to create drawings. Thereafter, the paper is developed with photo chemicals to expose the drawn images.

4 Claims, 8 Drawing Sheets

APPARATUS AND METHOD OF DRAWING WITH LIGHT

CROSS-REFERENCE TO RELATED APPLICATIONS

This application claims the benefit of provisional patent application Ser. No. 61/008,112, filed Dec. 17, 2007 by the present inventor.

FEDERALLY SPONSORED RESEARCH

Not applicable

SEQUENCE LISTING

Not applicable

BACKGROUND

This invention generally relates to producing visual, artistic effects, specifically to an apparatus and method for drawing with light.

PRIOR ART

The creation of art is found throughout the history of mankind, and artists are constantly seeking new means for expression. New discoveries and tools for artistic creations have been found throughout the history of art. Yet, no previous artistic tool has been developed to draw with a light emitting diode (LED).

Previously discovered art forms which utilize light are related to photography. Examples include a photograph, a photogram, a rayograph, and a photogenic drawing. These light related art mediums however are confined to pre-existing objects. These methods involve the use of an object in the process of their creation which limits the process to a mere recording of light rather than an original creation with light. The present invention allows for infinite original creations with light.

Previously discovered art forms for drawing include a variety of media, such as graphite, charcoal, marker, pastel, ink, and more which can be applied to a variety of surfaces, such as paper, cardboard, canvas, wood, plastic, and more. The present invention however is novel in its use of light as the drawing medium.

The only known prior patent which relates to the present invention is U.S. Pat. No. 4,455,369 to Purro. This patent discloses a device having a fiber optic transmission cable interconnected between a halogen light source and a selectively shuttered drawing wand. This patent describes how the wand is used to shine light on select portions of commercially available Cibachrome-A (Ilford™) photographic paper or other known photographic paper. This patent also describes how the exposed photographic paper is thereafter developed by conventional photographic developing processes.

Drawbacks to this prior patent include its use of a probe which provides only one size light beam; its use of a transformer box; its use of a halogen bulb; its use of filters for varied colors; and its use of stencils to pre-select areas of paper.

One of the primary advantages of the present invention is the invention of an apparatus. The invented apparatus is designed with a cylindrically shaped body, providing a more authentic drawing tool, which fits the contour of one's hand for ease of control and mobility. The apparatus houses an aperture which allows a variety of light beam sizes to be used, thus allowing for more varied line and image forms. The said apparatus also includes a battery which eliminates the need for an outlet source of power. This makes the product much more desirable internationally, and it provides unlimited mobility.

Another primary advantage of the present invention is the use of a LED. The LED is highly efficient, producing more light per watt than do halogen bulbs, which is useful in battery powered devices. LEDs have an extremely long life span. The calculated Estimated Time to Failure (ETTF) can be between 100,000 and 1,000,000 hours. Halogen light bulbs are rated at about 1,000-2,000 hours. The LED's ability to be as small as 1 mm provides a small area source, which allows for precise and fine drawn lines and eliminates the need for stencils to mask areas. LED's have the ability to emit light of an intended color without the use of color filters, producing light in a wide variety of colors much more efficiently, which can lower costs. With this wide variety of colors, arrays of multicolor LEDs can be designed to produce unconventional color patterns. The LED is designed to focus its light, whereas halogen sources often require an external reflector to collect light and direct it in a usable manner. LEDs cast light in one direction at a narrow angle compared to a halogen bulb of the same lumen level. LEDs do not change their color tint as the current passing through them is lowered, unlike halogen bulbs, which turn yellow. LEDs are ideal for use in applications that are subject to frequent on-off cycling, unlike halogen bulbs that burn out more quickly when cycled frequently. LEDs light up very quickly, typically achieving full brightness in microseconds, which in the invented process is significant time.

Therefore, because of the prior art's lack of inclusion of a tool fit for artistic drawing, and its lack of availability of LEDs, is felt to be of nothing more than general interest and cannot be considered as anticipatory of the precise and controllable techniques allowed for with an apparatus containing a LED embodied in the present invention.

Accordingly, it is shown that the present invention for drawing with light has the advantages of:
cylindrically shaped body of an authentic drawing tool,
ease of control and mobility,
variety of apertures,
variety of colors,
variety of intensities,
battery powered, and
use of LED.

In conclusion, insofar as I am aware, no apparatus has been invented to draw with light. Furthermore, no method of drawing with light formerly developed provides the range of colors, intensities, or apertures, nor the ease and mobility, of the present invention.

SUMMARY

One aspect of the present invention is a self-contained, hand-held apparatus comprising a hollow, cylindrically shaped body that is sized and configured for grasping in a person's hand. The apparatus body houses a battery and a light emitting diode. The light emitting diode is selected from various colors and intensities. A switch is mounted to the apparatus body, controlling the on/off status of the light emitting diode. A lens defines an aperture and is mounted to the apparatus body. The battery powers the light emitting diode in response to operation of the switch. Light is passed through the aperture, which controls the size of the emitted beam of light, and the lens, which controls the focus of the emitted beam of light.

Another aspect of the present invention is a method comprising passing the above-described apparatus over select areas of light sensitive paper under darkroom conditions to draw with light. Thereafter the light sensitive paper is developed with photo chemicals to expose the drawn images.

REFERENCES NUMERALS 20 apparatus
21 apparatus body
22 switch
23 tip cap
24 lens
25 end cap
26 LED
27 threading
28 large tip cap
29 medium tip cap
30 small tip cap
31 large aperture
32 medium aperture
33 small aperture
34 battery
35 light
36 light sensitive paper
37 select pattern
38 drawing

DETAILED DESCRIPTION

Figure 1:
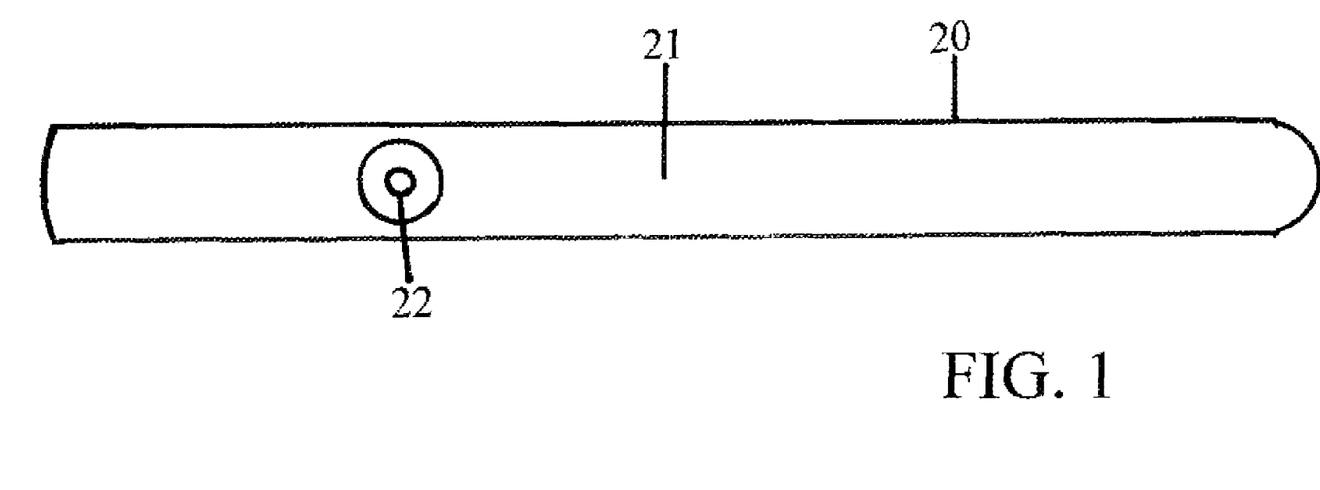
FIG. 1 shows a right side view of the apparatus.

FIG. 1 shows a right side view of the apparatus 20 which is preferably constructed from, though not limited to, extruded aluminum. The apparatus body 21 is shown in a preferable hollow cylindrically shaped body, fitting the contour of one's hand for ease of mobility. However other shapes have also been contemplated to allow more diversity in light 35 shape and size. The switch 22 mechanism, which controls the on/off status of the LED 26, is illustrated on the outside of the apparatus 20.

Figure 2:
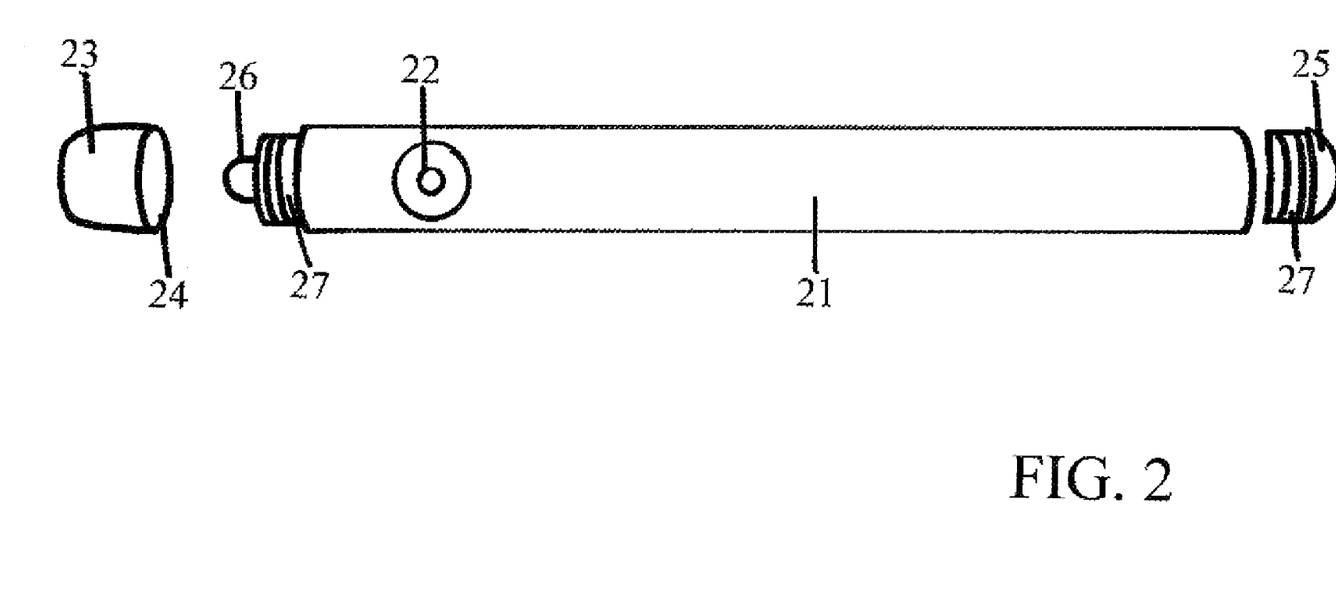
FIG. 2 shows an exploded right side view of the apparatus.

FIG. 2 shows an exploded right side view of the apparatus 20 in which the tip cap 23 and end cap 25 are removed. The tip cap 23 houses the lens 24 of any typical Fresnel lens configuration that focuses the light 35 emitting from the LED 26 into a light beam that passes through the tip cap 23. Threading 27 is contained within the tip cap 23, the end cap 25, and the aperture body 21 to allow the removal both the tip cap 23 and end cap 25 from the aperture body 21. The end cap 25 is removal to allow the insertion and change of batteries.

Figure 3:
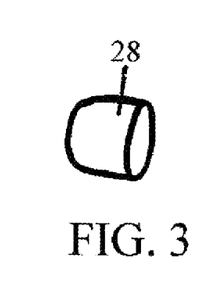
FIG. 3 shows a right side view of a large tip cap.
Figure 4:
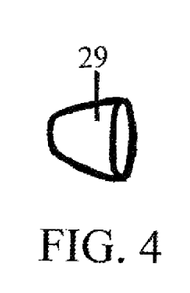
FIG. 4 shows a right side view of a medium tip cap.
Figure 5:
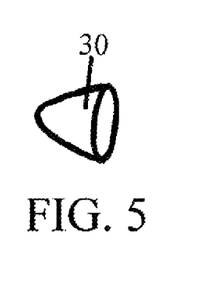
FIG. 5 shows a right side view of a small tip cap.

FIG. 3 shows a right side view of a large tip cap 28. FIG. 4 shows a right side view of a medium tip cap 29. FIG. 5 shows a right side view of a small tip cap 30. The tip cap 23 houses the aperture and is preferably interchangeable to allow a maximum of aperture sizes. The changing of the tip cap 23 with aperture is an economical solution to varying the aperture size. However, is recognized that a number of other solutions may also satisfy the need of various aperture sizes.

Figure 6:
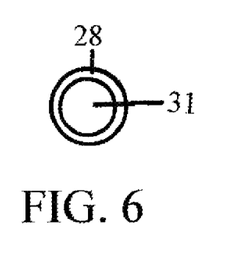
FIG. 6 shows a top side view of a large tip cap with large aperture.
Figure 7:
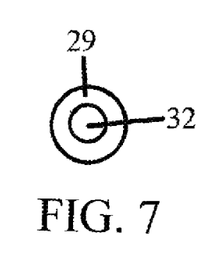
FIG. 7 shows a top side view of a medium tip cap with medium aperture.
Figure 8:
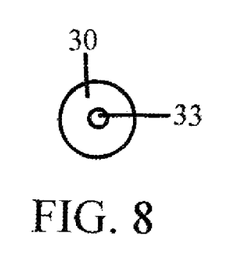
FIG. 8 shows a top side view of a small tip cap with small aperture.

FIG. 6 shows a top side view of a large tip cap 28 with large aperture 31. FIG. 7 shows a top side view of a medium tip cap 29 with medium aperture 32. FIG. 8 shows a top side view of a small tip cap 30 with small aperture 33. The preferred embodiment of the apparatus 20 is to have numerous aperture sizes for maximum light 35 and pattern variety.

Figure 9:
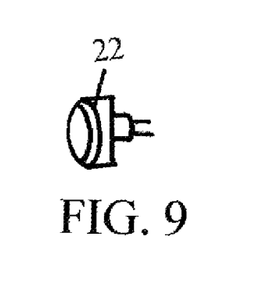
FIG. 9 shows a right side view of the switch.
Figure 10:
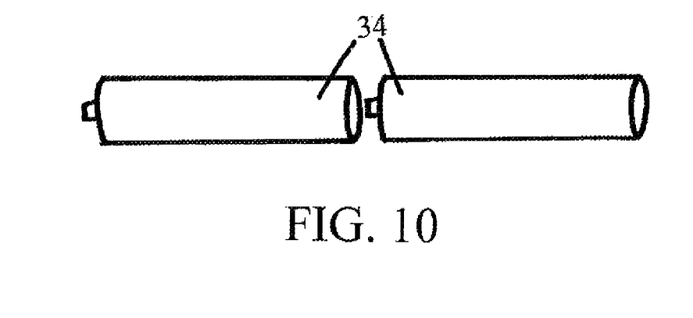
FIG. 10 shows a right side view of the battery.
Figure 11:
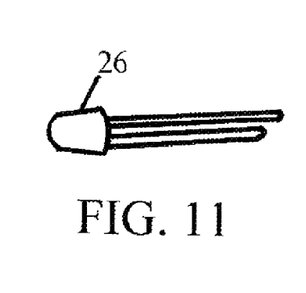
FIG. 11 shows a right side view of the LED.

FIG. 9 shows a right side view of the switch 22 which powers the battery 34. FIG. 10 shows a right side view of the battery 34 which powers the LED 26 and is housed within the apparatus body 21. It has been found that two AA batteries are best used in the apparatus 20. FIG. 11 shows a right side view of the LED 26 which is housed in the apparatus body 21. The LED 26 is interchangeable within the apparatus 20 allowing for a maximum variety of colors and intensities.

Figure 12:
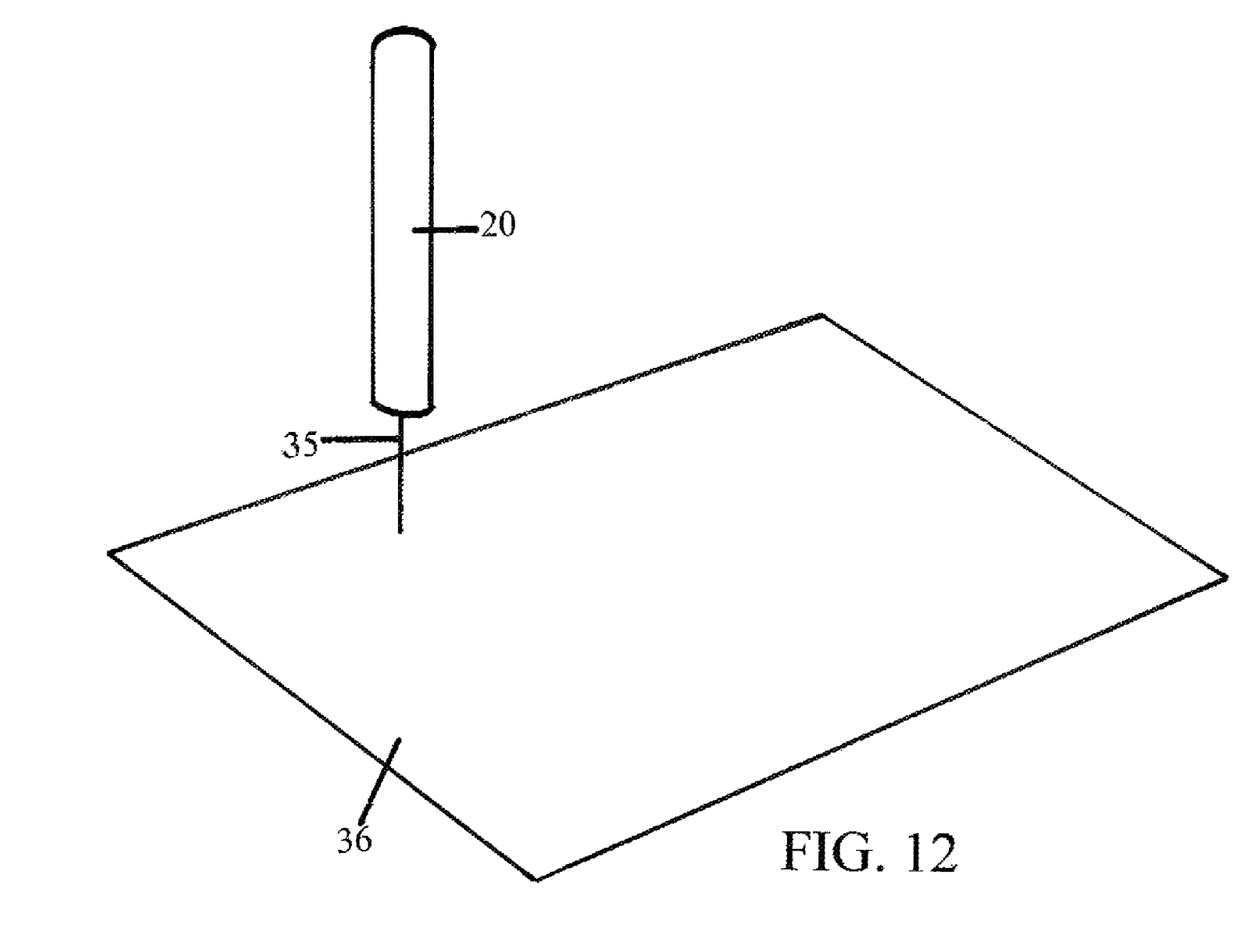
FIG. 12 shows a front perspective view of the apparatus emitting light onto light sensitive paper.

FIG. 12 shows a front perspective view of the apparatus 20 emitting light 35 under darkroom conditions onto light sensitive paper 36. The light 35 is emitted from the LED 26, which is of a pre-select color and intensity, through the tip cap 23, which houses a pre-select size aperture.

Figure 13:
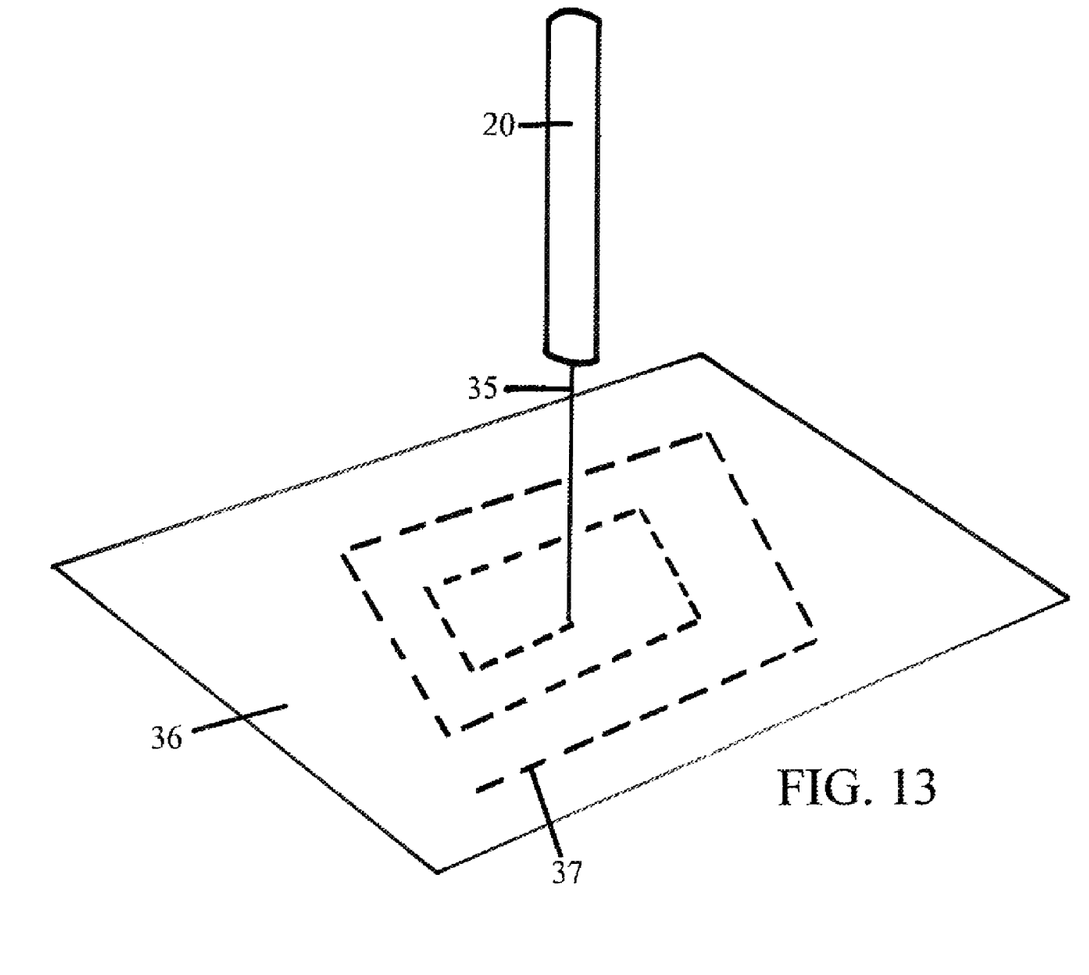
FIG. 13 shows a front perspective view of the apparatus emitting light onto light sensitive paper in select pattern.

FIG. 13 shows a front perspective view of the apparatus 20 emitting light 35 under darkroom conditions in select pattern 37 by being passed over select areas of commercially available light sensitive paper 36, including, for example, the photographic paper described in the Purro patent. This method illustrates drawing with light and provides an infinite possibly of drawings and images.

Figure 14:
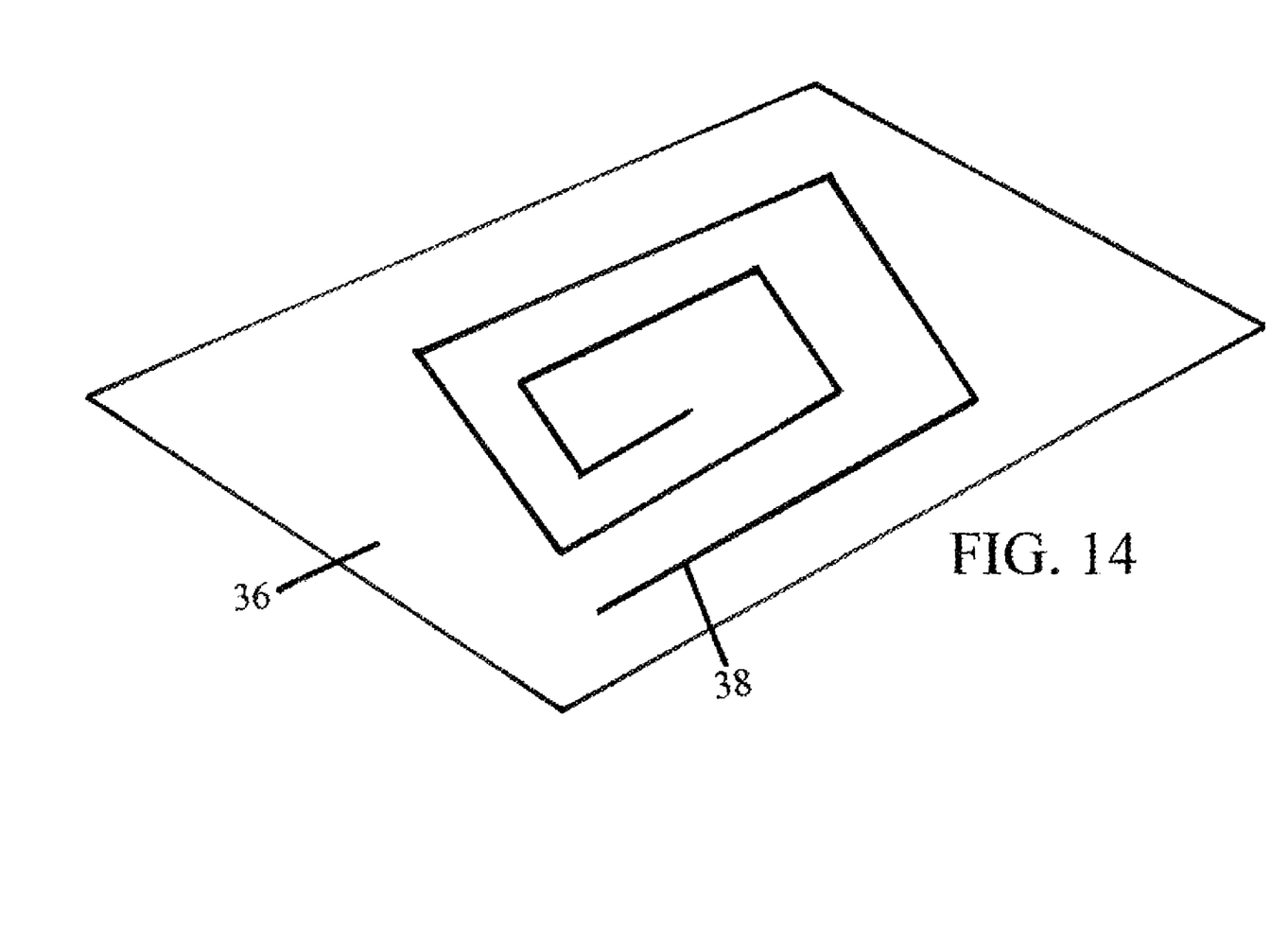
FIG. 14 shows a front perspective view of a drawing on light sensitive paper.

FIG. 14 shows a front perspective view of a drawing 38 on light sensitive paper 36 after the development of the light sensitive paper 36 with commercially available photo chemicals which is required to expose the drawn image, as is described, for example, in the Purro patent.

Operation

In operation an individual uses the apparatus 20 to draw with light 35 onto light sensitive paper 36. The user pre-selects the color and intensity of light 35 desired as well as the aperture size desired. The user may use only one color, intensity, or aperture, or the user may use an infinite combination of colors, intensities, and apertures. Under darkroom conditions, the user turns the apparatus on by way of the switch 22. The switch 22 provides power to the battery 34 which powers the LED 26. The LED 26 emits light 35 through the lens 24, which focuses the light 35, and out the aperture, which controls the size of the light beam. The user manually passes the apparatus 20 over select areas of light sensitive paper 36, thereby depicting shapes and forms by means of lines to create a drawing 38. Thereafter, the light sensitive paper 36 is developed with photo chemicals to expose the drawing 38.

I claim:

1. A method of artistic expressions using light sensitive paper together with a self-contained, hand-held apparatus having a body sized and configured for grasping in a person's hand, a light source supported by the body, a battery supported by the body, and a switch interconnected between the battery and the light source, to create an image on the light sensitive paper, comprising the steps of:

(a) placing the light sensitive paper in a dark space;

(b) holding the self-contained, hand-held apparatus in one's hand;

(c) operating the switch to selectively activate the light source;

(d) securing a first aperture defining cap to the body;

(e) passing the self-contained, hand-held apparatus over the light sensitive paper in a manner that directs light from the light source onto the light sensitive paper using a first LED of a first color as the light source; and (f) thereafter developing the light sensitive paper using photo chemicals to expose the drawn image.

2. The method of claim 1, wherein the securing step further comprises the step of replacing the first aperture defining cap with a second, discrete aperture defining cap and then repeating said passing step.

3. The method of claim 1, further comprising the step of replacing the first LED of the first color with a second LED of a different, second color and then repeating said passing step.

4. A method of using light sensitive paper together with a self-contained, hand-held apparatus having a body sized and configured for grasping in a person's hand, wherein the body defines a light receiving space, a battery supported by the body, and a switch connected to the battery, to create an image on the light sensitive paper, comprising the steps of:

(a) inserting an LED having desired color and intensity into the light receiving space in a manner that connects the LED to the switch;

(b) attaching a lens member having a desired aperture to the body in proximity to the LED;

(c) placing the light sensitive paper in a dark space;

(d) holding the self-contained, hand-held apparatus in one's hand;

(e) operating the switch to energize the LED;

(f) passing the apparatus over the light sensitive paper in a manner that directs light from the LED through the lens member and onto the light sensitive paper; and (g) thereafter developing the light sensitive paper using photo chemicals to expose the drawn image.

\* \* \* \* \*